United States Patent
Liu et al.

(10) Patent No.: US 8,838,104 B2
(45) Date of Patent: Sep. 16, 2014

(54) METHOD FOR HANDOVER IN A MOBILE WIRELESS SYSTEM

(75) Inventors: Hsien-Chang Liu, Nantou County (TW); Hong-Kai Hsu, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 2158 days.

(21) Appl. No.: 11/774,740

(22) Filed: Jul. 9, 2007

(65) Prior Publication Data

US 2008/0096561 A1    Apr. 24, 2008

Related U.S. Application Data

(60) Provisional application No. 60/829,884, filed on Oct. 18, 2006.

(51) Int. Cl.
*H04W 36/00* (2009.01)
*H04W 36/08* (2009.01)
*H04W 48/16* (2009.01)
*H04W 36/30* (2009.01)

(52) U.S. Cl.
CPC .............. *H04W 36/08* (2013.01); *H04W 48/16* (2013.01); *H04W 36/30* (2013.01)
USPC ............................ 455/436; 455/434; 370/332

(58) Field of Classification Search
CPC ...... H04W 36/08; H04W 36/30; H04W 48/16
USPC ........... 455/436–437, 422.1, 428, 432.1–453, 455/434, 67.13; 370/328–338, 252
See application file for complete search history.

(56) References Cited

U.S. PATENT DOCUMENTS

| | | | |
|---|---|---|---|
| 6,278,877 B1 | 8/2001 | Brederveld et al. | |
| 6,292,660 B1 * | 9/2001 | Hartless et al. | 455/434 |
| 6,522,881 B1 * | 2/2003 | Feder et al. | 455/437 |
| 6,580,700 B1 * | 6/2003 | Pinard et al. | 370/332 |
| 2006/0040662 A1 * | 2/2006 | Kim et al. | 455/434 |
| 2006/0205406 A1 * | 9/2006 | Pekonen et al. | 455/436 |
| 2007/0054667 A1 * | 3/2007 | Lee et al. | 455/434 |
| 2008/0096564 A1 * | 4/2008 | Jung et al. | 455/436 |
| 2008/0212537 A1 * | 9/2008 | Bukai | 370/332 |

FOREIGN PATENT DOCUMENTS

CN        1183014        5/1998

OTHER PUBLICATIONS

CN Office Action mailed Jun. 26, 2009.
English Abstract of CN1183014.
DE Office Action (issued May 9, 2012).
English translation of DE Office Action (issued May 9, 2012).

* cited by examiner

*Primary Examiner* — Mahendra Patel
(74) *Attorney, Agent, or Firm* — McClure, Qualey & Rodack, LLP

(57) ABSTRACT

A mobile station operating in a wireless network system comprising a plurality of base stations is disclosed. A communication unit receives the messages from a first base station of the wireless network system to which the mobile station is currently connected. A signal detection unit detects a first averaged signal strength corresponding to the messages received from the first base station. A processor determines a scan period according to the first averaged signal strength, performing a background scan, at intervals during the scan period, to monitor messages from the plurality of base stations within the wireless network system.

16 Claims, 7 Drawing Sheets

METHOD FOR HANDOVER IN A MOBILE WIRELESS SYSTEM

CROSS REFERENCE TO RELATED APPLICATIONS

This application claims priority of U.S. Provisional Patent Application Ser. No. 60/829,884, filed Oct. 18, 2006. The contents of the provisional application are hereby incorporated by reference.

BACKGROUND

The invention relates to a wireless local area network (WLAN), and more particularly to a handover mechanism for a mobile station in a WLAN.

This section is intended to introduce the reader to various aspects of the art, which may be related to various aspects of the invention, which are described and/or claimed below. This discussion is believed to be helpful in providing the reader with background information to facilitate a better understanding of the various aspects of the invention. Accordingly, it should be understood that these statements are to be read in this light, and not as admissions of related art.

In a mobile station (MS), such as a mobile phone, rather than a base station (BS), initiates a handover operation in a conventional handover mechanism. The mobile station gathers information to determine a time and target for performing a handover.

A conventional mobile station is capable of operating in normal and search modes. Referring to FIGS. 1A and 1B, a mobile station operating in normal mode can receive and/or place a call. When the mobile station operates in normal mode (step S102), the mobile station periodically receives beacons from a base station (BS) (step S104), while the mobile station is connected to the base station (hereinafter referred to as a current base station). In step S106, the mobile station determines a signal strength corresponding to the current base station. In step S108, it is determined whether signal strength determined in step S106 is stronger than a first threshold (TH1), and if so, the mobile station remains in normal mode, if not, step S112 proceeds. In step S112, the mobile station switches to search mode. In search mode, the mobile station receives beacons from an adjacent base station X (step S116), and determines signal strength corresponding to the base station X (step S118). In step S120, it is determined whether the signal strength determined in step S118 is stronger than a second threshold (TH2), and if so, the method proceeds to step S123, and otherwise, the method returns to step S116 to continue searching other channels. In step S123, it is determined whether the base station X is the current base station. If the base station X is the current BS, the mobile station switches back to normal mode (step S126). If signal strength corresponding to the base station X is stronger than TH2, and the base station X is different form the current BS, the mobile station hands over to the base station X (step S124).

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention.

A method of operating a mobile station in a wireless network system is provided, wherein the wireless network system comprises a plurality of base stations. The messages are received from a first base station of the wireless network system to which the mobile station is currently connected. First averaged signal strength corresponding to the messages received from the first base station is determined. A scan period is determined according to the first averaged signal strength. A background scan is performed at intervals during the scan period to monitor messages from the plurality of base stations within the wireless network system.

A mobile station operating in a wireless network system comprising a plurality of base stations is provided. A communication unit receives the messages from a first base station of the wireless network system to which the mobile station is currently connected. A signal detection unit detects a first averaged signal strength corresponding to the messages received from the first base station. A processor determines a scan period according to the first averaged signal strength, performs a background scan at intervals during the scan period, to monitor messages from the plurality of base stations within the wireless network system.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve developer specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The invention is now described with reference to FIGS. 2 through 6, which generally relate to controlling a mobile station. In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the figures correspond to the Figure number, with the exception that the same reference number is used throughout to refer to an identical component which appears in multiple figures. It should be understood that many of the elements described and illustrated throughout the specification are functional in nature and may be embodied in one or more physical entities or may take other forms beyond those described or depicted.

The invention can be implemented in a mobile station connected to a wireless local area network operating according to the IEEE 802.11 standard.

Figure 1A:
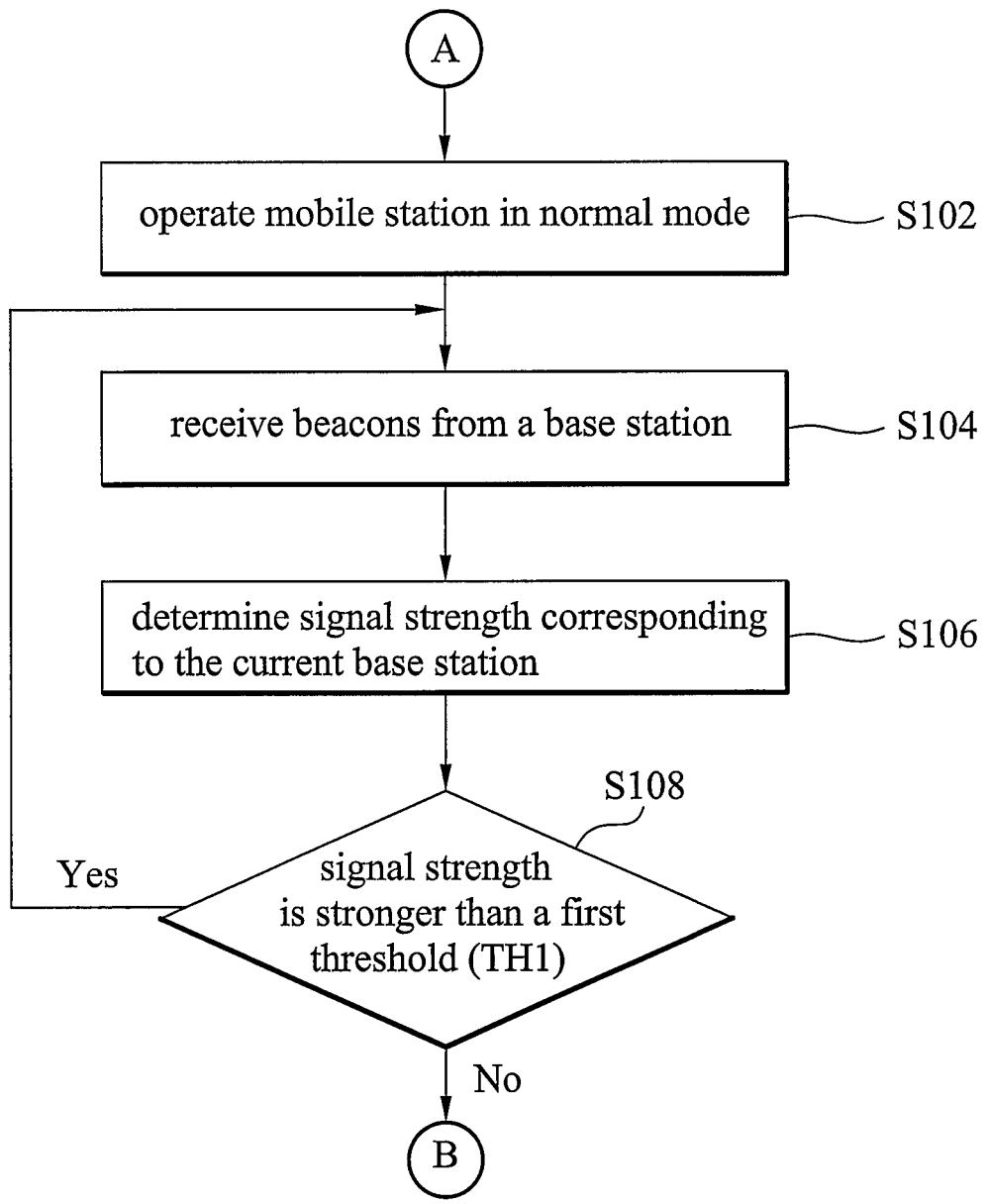
FIG. 1 is a flowchart of a conventional handover method for a mobile station in a wireless local access network.
Figure 1B:
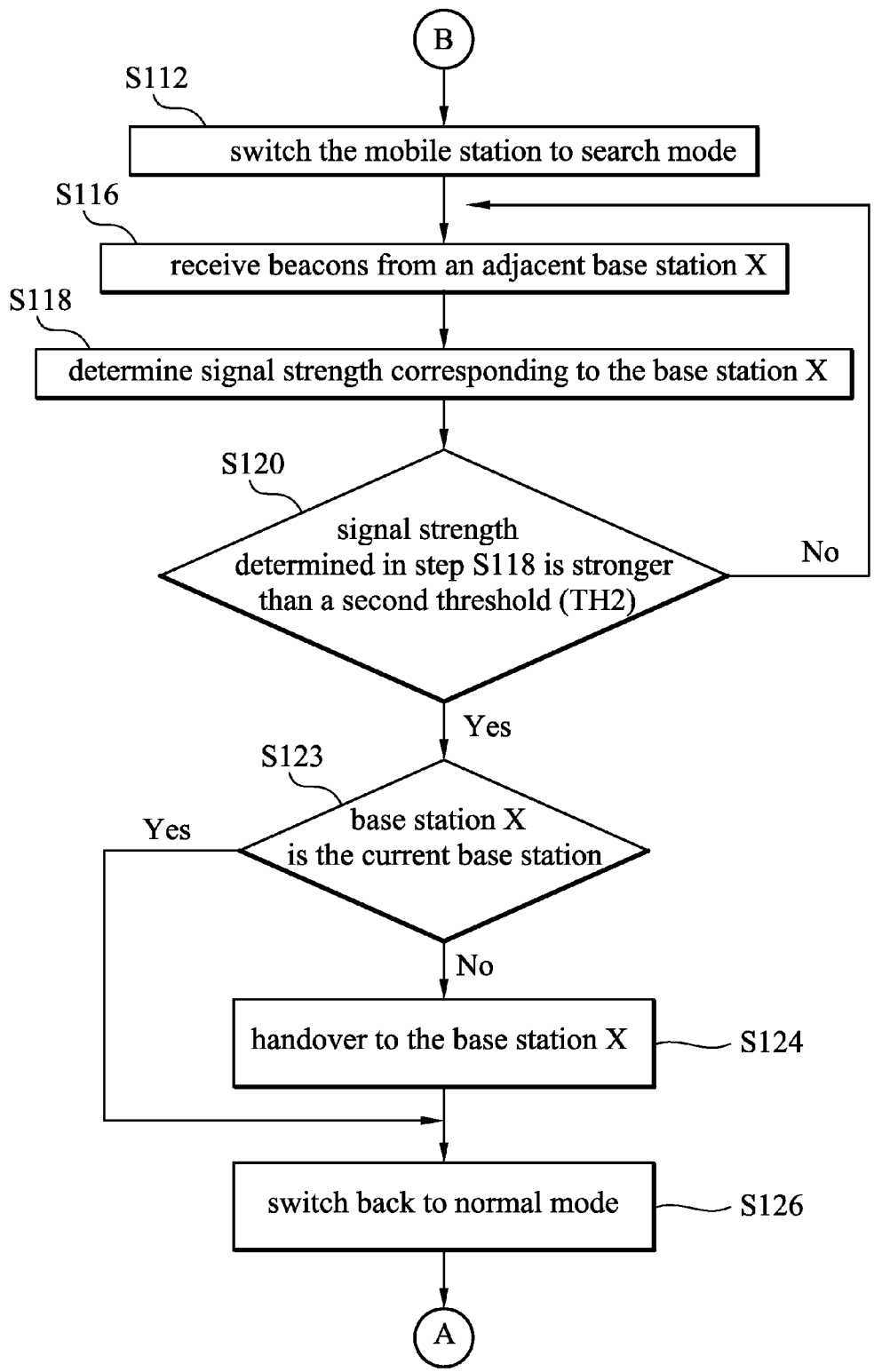
Figure 2:
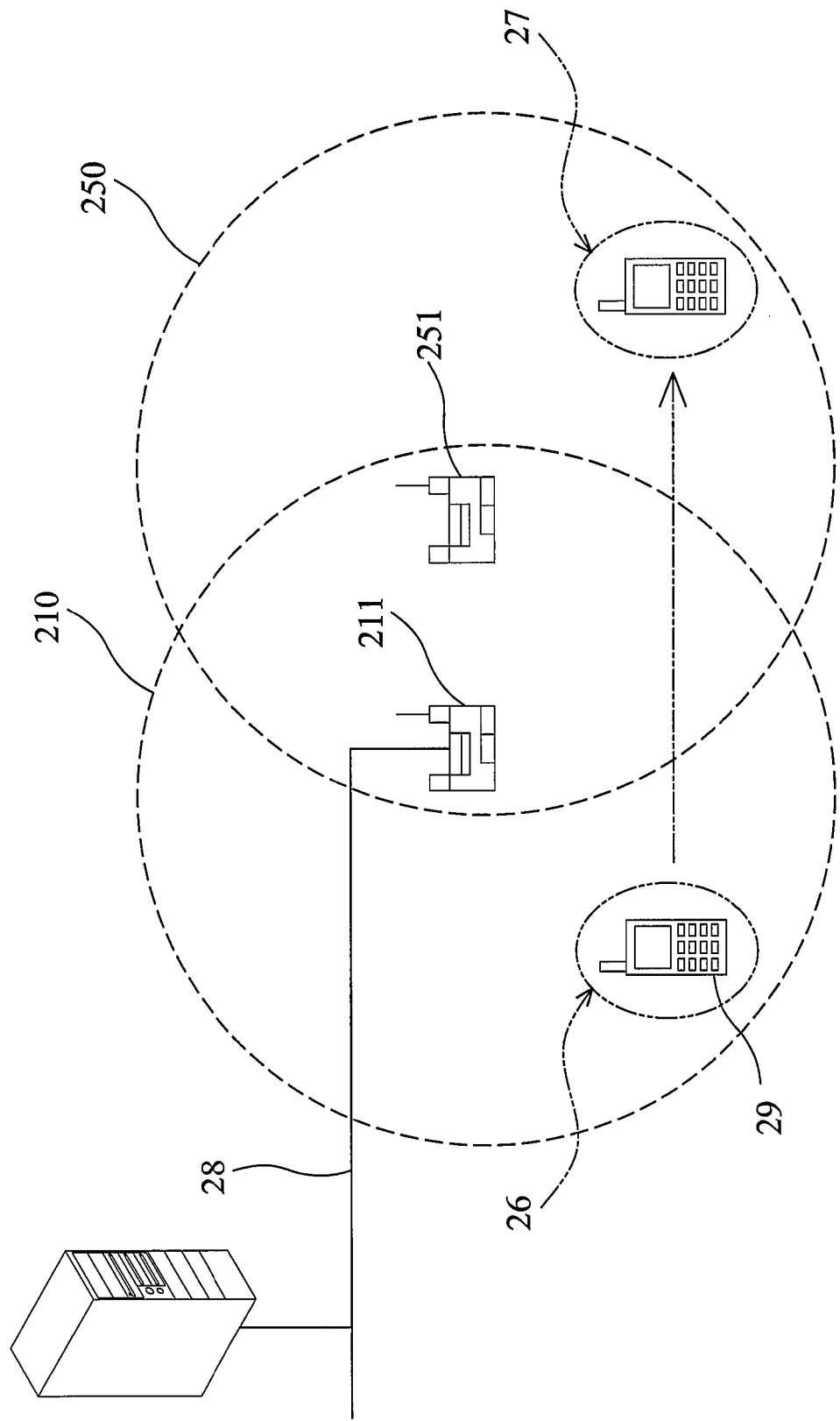
FIG. 2 is a schematic view of an embodiment of a wireless communication network.

FIG. 2 is a schematic view of an embodiment of a wireless communication network. FIG. 2 illustrates wireless local area networks (WLANs) 210 and 250. Devices capable of wireless communication can access WLANs 210 and 250 through base stations 211 and 251, respectively.

WLAN 210 comprises two basic elements, base station 211 and a client network card (not shown). Base station 211 connects to wired network backbone 28. Similarly, WLAN 250 comprises base station 251 and a client network card (not shown). The base station is the central point of a WLAN, or a connection point between a wired and wireless network. Multiple base stations may be arranged within a building or an important access site, enabling clients equipped with a WLAN network card to maintain uninterrupted connection even when moving. For example, in this case, a mobile phone 29 comprising a wireless communication function can move from location 26 to location 27 using the wireless communication roaming function.

Figure 3:
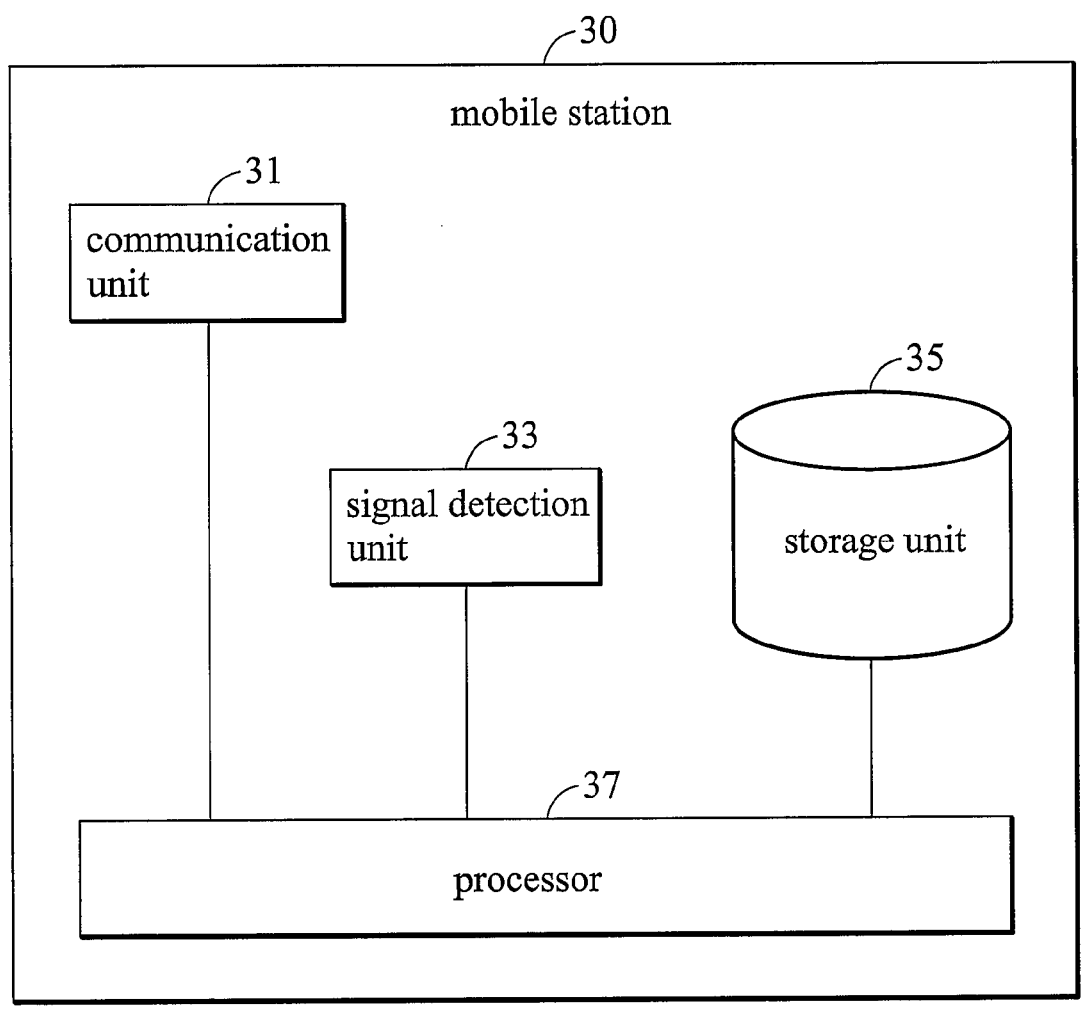
FIG. 3 is a block diagram of an embodiment of a mobile station.

FIG. 3 is a block diagram of an embodiment of a mobile station. A mobile station 30 operates in the wireless network system of FIG. 2. The mobile station 30 can be a mobile phone or other portable data processing device provided with a wireless transceiver. The mobile station 30 comprises a communication unit 31, a signal detection unit 33, a storage unit 35, and a processor 37.

The communication unit 31 receives the messages from a first base station of the wireless network system to which the mobile station 30 is currently connected. Here, the messages are beacon packets sent from each of the base stations at regular intervals.

The signal detection unit 33 detects a first averaged signal strength corresponding to the messages received from the first base station. Here, the first averaged signal strength specifies an average of Received Signal Strength Indications (RSSI) corresponding to the received messages.

The storage unit 35 stores a series of preset signal strength ranges, each corresponding to a respective time interval.

The processor 37 determines a scan period according to the first averaged signal strength, performs a background scan, at intervals during the scan period, to monitor messages from the plurality of base stations within the wireless network system. In addition, the processor 37 further determines to which signal strength range the first averaged signal strength conforms to, and utilizes the corresponding time interval as the scan period.

In addition, the signal detection unit 33 further detects a second averaged signal strength corresponding to the messages sent from a second base station selected from the plurality of base stations within the wireless network system, and the processor 37 further determines a difference between the first averaged signal strength and the second averaged signal strength, and monitors the difference for a preset period of time, when the difference remains above a preset threshold during the preset period of time, a wireless connection is established between the mobile station and the second base station rather than the first base station. Here, the preset period of time can be determined to meet design requirements. For example, the preset period of time can be a predetermined fixed time interval variable according to the first averaged signal strength, the loss of connection between the first base station and the mobile station, a transmission retry event between the first base station and the mobile station, or can be set as a time period during which the background scan is performed N times, wherein N is a positive integer.

Figure 4:
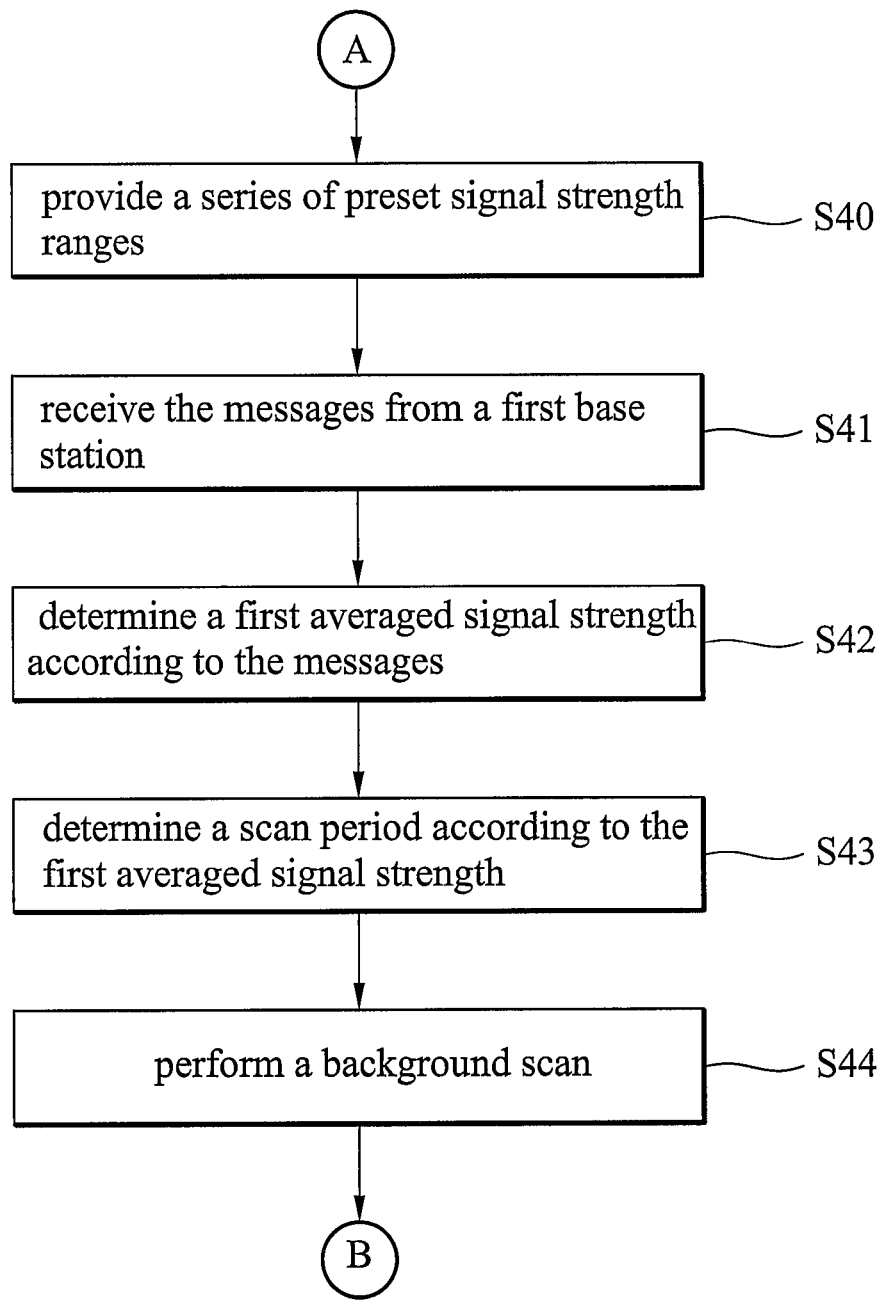
FIG. 4 is a flowchart of an embodiment of a background scan method.

FIG. 4 is a flowchart of an embodiment of a background scan method. Referring to FIG. 4, procedure A is performed to determine a period for performing a round of background scanning. A series of preset signal strength ranges are provided (step S40), wherein each signal strength range corresponds to a respective time interval.

The messages are received from a first base station of the wireless network system to which the mobile station is currently connected (step S41). Here, the messages are beacon packets sent from each of the base stations at regular intervals. In step S42, a first averaged signal strength is determined according to the messages received from the first base station. Here, the first averaged signal strength specifies an average of Received Signal Strength Indications (RSSI) corresponding to the received messages. The RSSI determined in step S41 is the averaged signal strength corresponding to the base station currently connected to the mobile station.

In step S43, a scan period is determined according to the first averaged signal strength. Here, it is determined to which signal strength range the first averaged signal strength belongs, the corresponding time interval is then utilized as the scan period.

For example, when the RSSI of the first base station (current base station) is greater than −40 dBm, the corresponding scan period is 60 seconds; when the RSSI locates between −40 dBm and −60 dBm, the scan period is reduced to 3 seconds. If the scan period is set to 3 seconds, a background scan for all channels is performed at an interval of 3 seconds to monitor and record the signal strength of other neighboring base stations.

In step S44, a background scan is performed, at intervals during the scan period determined in step S43, to monitor messages from the plurality of base stations within the wireless network system.

By performing the background scan executed in step S44, messages from neighboring base stations are monitored, and the monitored messages can be used to determine whether to handover communication from one base station to another while the mobile station is moving.

Figure 5:
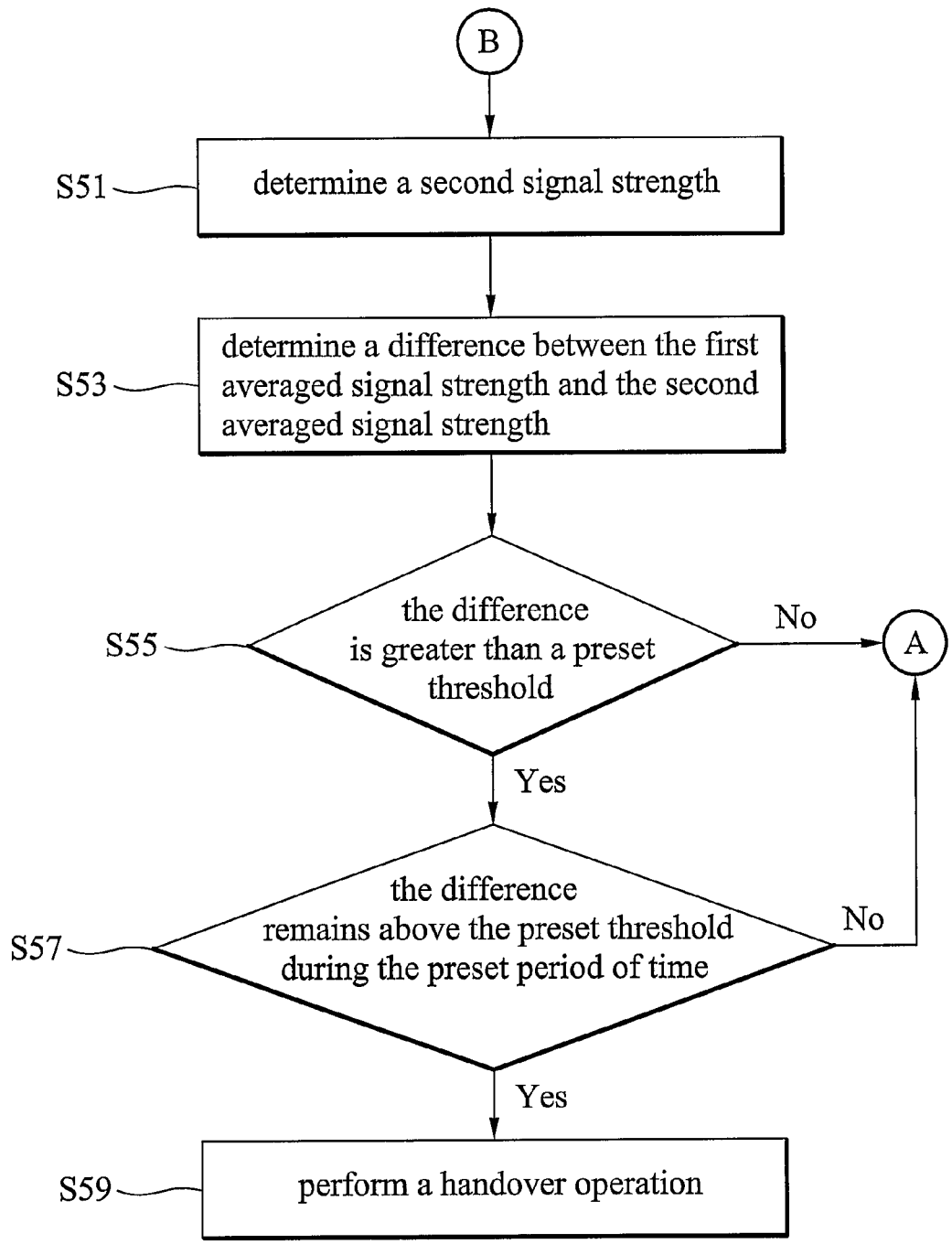
FIG. 5 is a flowchart of an embodiment of a handover method.

FIG. 5 is a flowchart of an embodiment of a handover method. Referring to FIG. 5, procedure B is performed to determine whether to handover communication from one base station to another while the mobile station is moving. Here, factors such as signal strength and confidence window are used to determine an appropriate time and target for handover.

In step S51, a second averaged signal strength is determined. The second averaged signal strength corresponds to the messages monitored in the background scan executed in step S45, wherein the messages is sent from a second base station selected from the plurality of base stations within the wireless network system.

In step S53, a difference between the first averaged signal strength and the second averaged signal strength is determined.

In step S55, it is determined whether the difference is greater than a preset threshold, and if so, the method proceeds to step S57, and otherwise, return to procedure A.

In step S57, the difference is monitored for a preset period of time, when the difference remains above the preset threshold during the preset period of time, the method proceeds to step S59, and otherwise returns to procedure A.

In step S59, a handover operation, comprising establishing a wireless connection between the mobile station and the second base station rather than the first base station, is performed.

Figure 6:
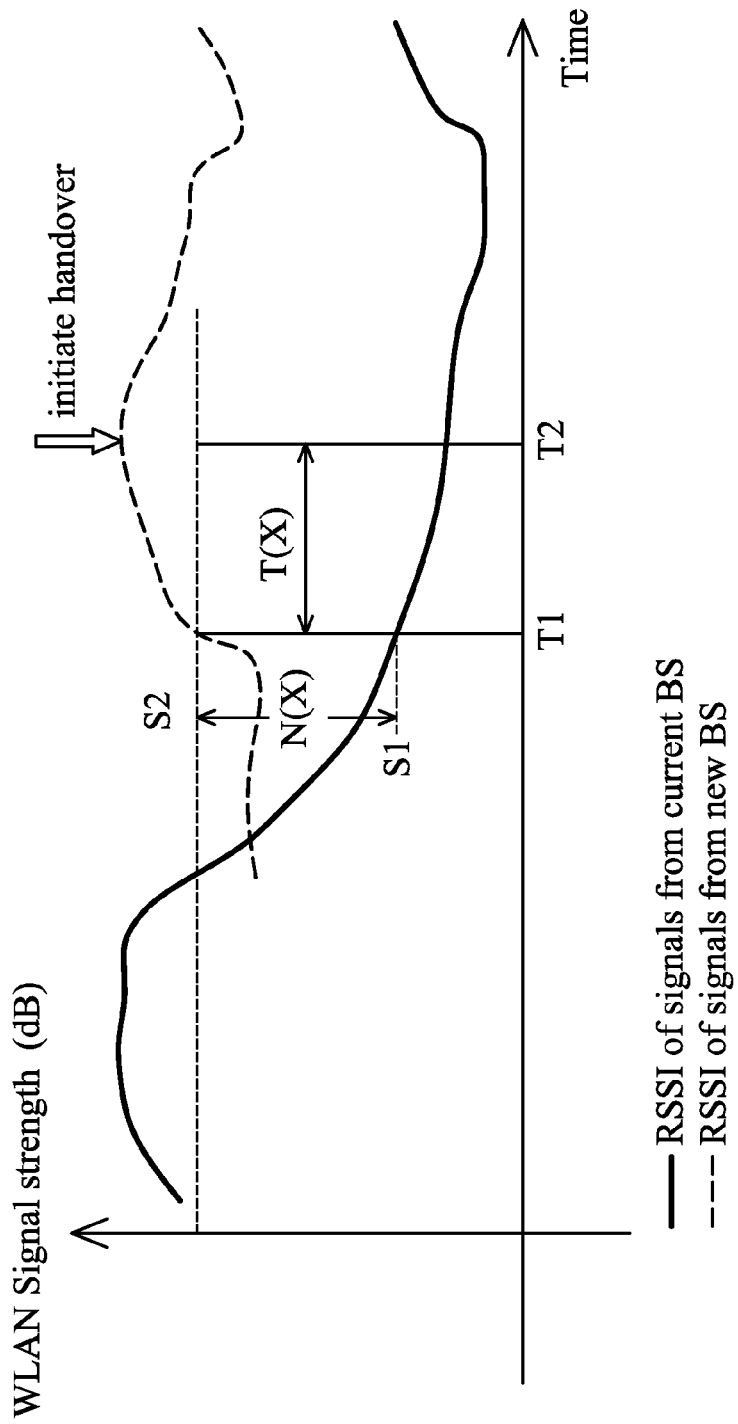
FIG. 6 illustrates an embodiment of a handover operation from a current base station to another base station.

FIG. 6 illustrates an embodiment of handover operation from a current base station to another base station. At time T1, the RSSI of the current base station is S1, and the RSSI of a new base station is S2. When the difference between S1 and S2 (the relative signal strength) is greater than the preset threshold (N(x)), a timer is triggered. At time T2, if the difference remains above a preset threshold during the preset period of time (confidence window, T(x)), the new base station is the handover target, and the handover is performed accordingly.

Here, the preset period of time can be determined to meet design requirements. For example, the preset period of time can be a predetermined fixed time interval, or can vary according to the first averaged signal strength, a lost connection event between the first base station and the mobile station, according to a transmission retry event between the first base station and the mobile station, or can be set as a time period during which the background scan is performed N times, wherein N is a positive integer.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of operating a mobile station in a wireless network system comprising a plurality of base stations, comprising:
   receiving the messages from a first base station of the wireless network system to which the mobile station is connected;
   determining a first averaged signal strength of the messages received from the first base station;
   determining a scan period according to the first averaged signal strength;
   performing a background scan, at intervals during the scan period, to monitor messages from the plurality of base stations of the wireless network system;
   providing a series of signal strength ranges, each corresponding to a respective time interval, determining to which the first averaged signal strength conforms to, and utilizing the corresponding time interval as the scan period;
   determining a second averaged signal strength of the messages sent from a second base station selected from the plurality of base stations of the wireless network system;
   determining a difference between the first averaged signal strength and the second averaged signal strength; and
   monitoring the difference for a preset period of time, when the difference remains exceed a preset threshold for the preset period of time, establishing a connection between the mobile station and the second base station rather than the first base station.

2. The method of claim 1, wherein the messages are beacon packets sent from each of the base stations at regular intervals.

3. The method of claim 1, wherein the first averaged signal strength specifies an average of Received Signal Strength Indications (RSSI) corresponding to the received messages.

4. The method of claim 1, wherein the preset period of time is a predetermined fixed time interval.

5. The method of claim 1, wherein the preset period of time varies according to the first averaged signal strength.

6. The method of claim 5, wherein the preset period of time is set as a time period during which the background scan has performed N times, wherein N is a positive integer.

7. The method of claim 1, wherein the preset period of time varies according to occurrence of a loss connection event between the first base station and the mobile station.

8. The method of claim 1, wherein the preset period of time varies according to a transmission retry event between the first base station and the mobile station.

9. A mobile station operating in a wireless network system comprising a plurality of base stations, comprising:
   a communication unit, receiving the messages from a first base station of the wireless network system to which the mobile station is connected;
   a signal detection unit, detecting a first averaged signal strength of the messages received from the first base station;
   a processor, determining a scan period according to the first averaged signal strength, and performing a background scan, at intervals during the scan period to monitor messages from the plurality of base stations within the wireless network system; and
   a storage unit, storing a series of preset signal strength ranges, each corresponding to a respective time interval, wherein the processor further determines to which the first averaged signal strength conforms to, and utilizes the corresponding time interval as the scan period;
   wherein the signal detector further detects a second averaged signal strength of the messages sent from a second base station selected from the plurality of base stations of the wireless network system, and the processor further determines a difference between the first averaged signal strength and the second averaged signal strength, and monitors the difference for a preset period of time, when the difference remains exceed a preset threshold for the preset period of time, establishes a connection between the mobile station and the second base station rather than the first base station.

10. The mobile station of claim 9, wherein the messages are beacon packets sent from each of the base stations at regular intervals.

11. The mobile station of claim 9, wherein the first averaged signal strength specifies an average of Received Signal Strength Indications (RSSI) corresponding to the received messages.

12. The mobile station of claim 9, wherein the preset period of time is a predetermined fixed time interval.

13. The mobile station of claim 9, wherein the preset period of time varies according to the first averaged signal strength.

14. The mobile station of claim 13, wherein the preset period of time is set as a time period during which the background scan has performed N times, wherein N is a positive integer.

15. The mobile station of claim 9, wherein the preset period of time varies according to occurrence of a loss connection event between the first base station and the mobile station.

16. The mobile station of claim 9, wherein the preset period of time varies according to occurrence of a transmission retry event between the first base station and the mobile station.

* * * * *